(12) United States Patent
Ding et al.

(10) Patent No.: US 12,437,775 B2
(45) Date of Patent: Oct. 7, 2025

(54) SPEECH PROCESSING METHOD, COMPUTER STORAGE MEDIUM, AND ELECTRONIC DEVICE

(71) Applicant: NETEASE (HANGZHOU) NETWORK CO., LTD., Zhejiang (CN)

(72) Inventors: Hanyu Ding, Zhejiang (CN); Yue Lin, Zhejiang (CN); Duisheng Chen, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 258 days.

(21) Appl. No.: 18/248,528

(22) PCT Filed: Feb. 22, 2021

(86) PCT No.: PCT/CN2021/077309
§ 371 (c)(1),
(2) Date: Apr. 11, 2023

(87) PCT Pub. No.: WO2022/083039
PCT Pub. Date: Apr. 28, 2022

(65) Prior Publication Data
US 2023/0395094 A1    Dec. 7, 2023

(30) Foreign Application Priority Data
Oct. 20, 2020   (CN) .................. 202011128423.3

(51) Int. Cl.
*G10L 25/60*   (2013.01)
*G10L 25/45*   (2013.01)
(Continued)

(52) U.S. Cl.
CPC .............. *G10L 25/60* (2013.01); *G10L 25/45* (2013.01); *G10L 25/84* (2013.01); *G10L 2025/783* (2013.01)

(58) Field of Classification Search
CPC .......... G10L 25/60; G10L 25/45; G10L 25/84
See application file for complete search history.

(56) References Cited

U.S. PATENT DOCUMENTS

| | | | | |
|---|---|---|---|---|
| 5,862,519 A | * | 1/1999 | Sharma | .................... G10L 15/04 704/E15.005 |
| 2005/0240397 A1 | * | 10/2005 | Jeon | ...................... G10L 19/265 704/219 |

(Continued)

FOREIGN PATENT DOCUMENTS

| | | |
|---|---|---|
| CN | 103745727 A | 4/2014 |
| CN | 107610707 A | 1/2018 |

(Continued)

OTHER PUBLICATIONS

1st Office Action dated Jun. 30, 2023 of Chinese Application No. 202011128423.3.

(Continued)

*Primary Examiner* — Daniel C Washburn
*Assistant Examiner* — Paul J. Mueller
(74) *Attorney, Agent, or Firm* — Qinghong Xu

(57) ABSTRACT

A speech processing method and apparatus, a computer storage medium, and an electronic device, relating to the technical field of speech processing. The speech processing method includes: acquiring a speech sequence, obtaining a plurality of speech sub-sequences by performing framing processing on the speech sequence, and extracting a target feature of each speech sub-sequence of the plurality of speech sub-sequences; detecting each speech sub-sequence of the plurality of speech sub-sequences by a speech detection model according to each target feature, and determining (Continued)

valid speech based on a detection result; inputting a target feature corresponding to the valid speech into a voiceprint recognition model, and screening out target speech from the valid speech by the voiceprint recognition model; and controlling the target speech to be forwarded to a client.

19 Claims, 16 Drawing Sheets

(51) Int. Cl.
    *G10L 25/78*     (2013.01)
    *G10L 25/84*     (2013.01)

(56) References Cited

U.S. PATENT DOCUMENTS

| | | | |
|---|---|---|---|
| 2006/0161430 A1* | 7/2006 | Schweng | G10L 25/78 |
| | | | 704/E11.003 |
| 2016/0322046 A1* | 11/2016 | Lahiri | G10L 15/187 |
| 2017/0178666 A1* | 6/2017 | Yu | G10L 25/30 |
| 2019/0325880 A1* | 10/2019 | Khitrov | G10L 17/24 |
| 2019/0392859 A1 | 12/2019 | Li | |
| 2020/0202702 A1* | 6/2020 | Gao | G10L 15/22 |
| 2020/0312343 A1* | 10/2020 | Hsiung | G06N 3/048 |
| 2020/0349928 A1* | 11/2020 | Mandal | G10L 15/30 |
| 2020/0402499 A1* | 12/2020 | Angkititrakul | G10L 25/84 |
| 2021/0209362 A1* | 7/2021 | Wexler | G06V 40/20 |
| 2021/0327402 A1* | 10/2021 | Xie | G10K 11/17885 |

FOREIGN PATENT DOCUMENTS

| | | |
|---|---|---|
| CN | 108877775 A | 11/2018 |
| CN | 110010133 A | 7/2019 |
| CN | 110164452 A | 8/2019 |
| CN | 111028847 A | 4/2020 |
| CN | 111081269 A | 4/2020 |
| CN | 111599371 A | 8/2020 |
| CN | 111696580 A | 9/2020 |
| CN | 111739515 A | 10/2020 |
| CN | 111755029 A | 10/2020 |
| CN | 112259114 A | 1/2021 |

OTHER PUBLICATIONS

International Search Report dated Jul. 30, 2021 of International Application No. PCT/CN2021/077309.
2nd Office Action dated Jan. 15, 2024 for Chinese Application No. 202011128423.3.

* cited by examiner a plurality of speech sequence samples are obtained, where the plurality of speech sequence samples include valid speech samples and non-valid speech samples — S610 a first tagging information sample of each speech sequence sample is obtained by tagging each valid speech sample and each non-valid speech sample — S620 each speech sequence sample and a corresponding first tagging information sample thereof are input to a candidate speech detection model, and the speech detection model is obtained by training the candidate speech detection model according to each speech sequence sample and the corresponding first tagging information sample thereof — S630

FIG.6

SPEECH PROCESSING METHOD, COMPUTER STORAGE MEDIUM, AND ELECTRONIC DEVICE

CROSS-REFERENCE TO RELATED APPLICATIONS

This application is the U.S. National Phase Application of the PCT International Application No. PCT/CN2021/077309, filed on Feb. 22, 2021, which is based upon and claims the priority of the Chinese Patent Application No. 202011128423.3, filed on Oct. 20, 2020, and entitled "SPEECH PROCESSING METHOD AND APPARATUS, COMPUTER STORAGE MEDIUM, AND ELECTRONIC DEVICE", the entire contents of which are hereby incorporated by reference in its entirety.

TECHNICAL FIELD

Embodiments of the present disclosure relate to the field of speech processing technology, and in particular, to a speech processing method, a computer-readable storage medium, and an electronic device.

BACKGROUND

With the development of communication technology and intelligent terminals, human-to-human communication is achieved through voice functions such as live streaming, calling, or chatting through intelligent terminals. However, when using the voice functions, the user's recording is often accompanied by a lot of background noise or other people's voices, making it impossible for other users to identify the actual content of that user's speech.

In the prior art, a TCP speech data transmission mode is used, in which voice streams are transmitted using a Transmission Control protocol (TCP). Although this transmission mode is reliable, the voice cannot be filtered and screened.

In view of above, there is an urgent need to develop a new speech processing method and device in the field.

It should be noted that the above information disclosed in the "BACKGROUND" section is intended only to enhance the understanding of the context of this disclosure and may therefore include information that does not constitute prior art known to those of ordinary skill in the art.

SUMMARY

The purpose of the present disclosure is to provide a speech processing method, a speech processing apparatus, a computer-readable storage medium, and an electronic device, so as to filter and screen, at least to some extent, speech sequences.

Other features and advantages of the present disclosure will become apparent through the following detailed description, or will be learned in part through the practice of the present disclosure.

In one embodiment of the present disclosure, there is provided a speech processing method. The method includes: acquiring a speech sequence, obtaining a plurality of speech sub-sequences by performing framing processing on the speech sequence, and extracting a target feature of each speech sub-sequence of the plurality of speech sub-sequences; detecting each speech sub-sequence of the plurality of speech sub-sequences by a speech detection model according to each target feature, and determining valid speech based on a detection result; inputting a target feature corresponding to the valid speech into a voiceprint recognition model, and screening out target speech from the valid speech by the voiceprint recognition model; and controlling the target speech to be forwarded to the other client.

In one embodiment of the present disclosure, there is provided a speech processing apparatus. The speech processing apparatus includes: an acquisition configured to acquire a speech sequence, obtain a plurality of speech sub-sequences by performing framing processing on the speech sequence, and extract a target feature of each speech sub-sequence of the plurality of speech sub-sequences; a detection module configured to detect each speech sub-sequence of the plurality of speech sub-sequences by a speech detection model according to each target feature, and determine valid speech based on a detection result; a recognition module configured to input a target feature corresponding to the valid speech into a voiceprint recognition model, and screen out target speech from the valid speech by the voiceprint recognition model; and a control module configured to control the target speech to be forwarded to the other client.

In one embodiment of the present disclosure, there is provided a computer-readable storage medium on which a computer program is stored. The computer program, when executed by a processor, causes the processor to implement the speech processing method as described in the above embodiments.

In one embodiment of the present disclosure, there is provided an electronic device, including one or more processors and a memory for storing one or more programs that, when executed by the one or more processors, cause the one or more processors to implement the speech processing method as described in the above embodiments.

It should be understood that both the foregoing general description and the following detailed description are exemplary and explanatory only and do not limit the present disclosure.

BRIEF DESCRIPTION OF THE DRAWINGS

The accompanying drawings, which are incorporated into and constitute a part of the specification, illustrate embodiments consistent with the present disclosure, and are used in conjunction with the specification to explain the principles of the present disclosure. Obviously, the drawings in the following description are only some embodiments of the present disclosure, and for those of ordinary skill in the art, other drawings can also be obtained from these drawings without creative effort.

FIG. 6 schematically illustrates a flow chart of a process for training a candidate speech detection model according to an embodiment of the present disclosure.

DETAILED DESCRIPTION

Example embodiments will now be described more fully with reference to the accompanying drawings. The example embodiments, however, can be embodied in various forms and should not be construed as limited to the examples set forth herein; rather, these embodiments are provided so that this disclosure will be thorough and complete, and will fully convey the concept of example embodiments to those skilled in the art.

In addition, the described features, structures, or characteristics may be combined in any suitable manner in one or more embodiments. In the following description, many specific details are provided so as to give a full understanding of the embodiments of the present disclosure. However, those of skill in the art will realize that the technical solutions of the present disclosure may be practiced without one or more of the specific details, or other methods, components, devices, steps, etc. may be employed. In other instances, well-known methods, devices, implementations, or operations are not shown or described in detail to avoid obscuring aspects of the present disclosure.

The block diagrams shown in the accompanying drawings are only functional entities and do not necessarily have to correspond to physically separate entities. That is, these functional entities may be implemented in software form, or in one or more hardware modules or integrated circuits, or in different network and/or processor devices and/or microcontroller devices.

The flow charts shown in the accompanying drawings are illustrative only and are not necessarily all inclusive of the contents and operations/steps, nor are that it must be executed in the order described. For example, some operations/steps may also be decomposed, while others may be combined or partially combined, so the actual order of execution may change depending on the actual situation.

Figure 1:
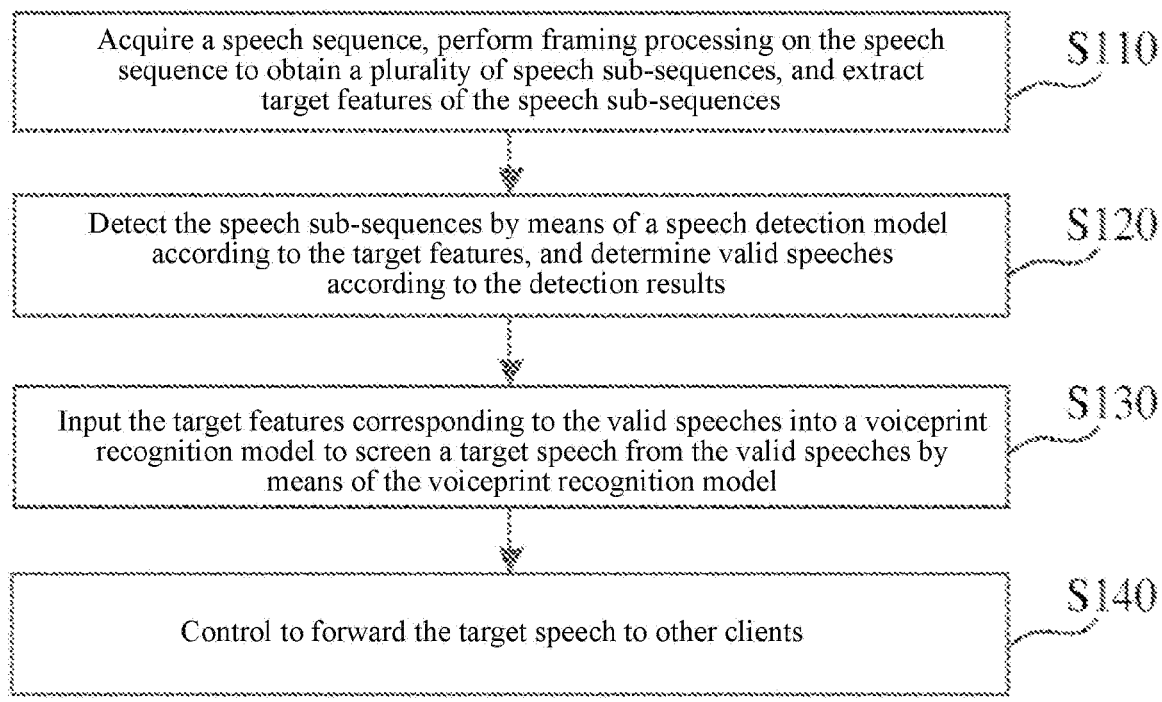
FIG. 1 schematically illustrates a flow chart of a speech processing method according to an embodiment of the present disclosure.

In an embodiment of the present disclosure, a speech processing method is proposed. The speech processing method can be applied in, but not limited to, the following scenarios: voice transmission in a live streaming, voice transmission in a web conference, voice transmission in a group chat of a social software group or in a group video, voice transmission in user voice calls, etc. The specific application scenarios of the speech processing method are not limited in the present disclosure, and the variations of the specific application scenarios should be understood to fall within the scope of protection of the present disclosure. FIG. 1 illustrates a flow chart of a speech processing method. As shown in FIG. 1, the speech processing method includes at least the following steps.

Step S110, acquiring a speech sequence, obtaining a plurality of speech sub-sequences by performing framing processing on the speech sequence, and extracting a target feature of each speech sub-sequence of the plurality of speech sub-sequences.

Step S120, detecting each speech sub-sequence of the plurality of speech sub-sequences by a speech detection model according to each target feature, and determining valid speech based on a detection result.

Step S130, inputting a target feature corresponding to the valid speech into a voiceprint recognition model, and screening out target speech from the valid speech by the voiceprint recognition model.

Step S140, controlling the target speech to be forwarded to the other client.

According to the speech processing method in the embodiments of the present disclosure, on the one hand, the speech sequence is filtered and screened through the speech detection model and the voiceprint recognition model, so that the non-valid speech and the non-target speech are filtered out, which saves the bandwidth of the server for transmitting the speech sequence and reduces the loss of the server; on the other hand, the target speech in the speech sequence is determined by the speech detection model and the voiceprint recognition model, which improves the speech quality of the speech sequence and enhances the user's experience; on yet another hand, a plurality of speech sub-sequences are obtained by framing the speech sequence, and each speech sub-sequence can be processed using the speech detection model and the voiceprint recognition model, which improves the efficiency of speech processing and enhances the accuracy of speech processing.

It should be noted that the speech processing method provided by embodiments of the present disclosure is generally performed by a processor with computing functions. The processor may include a terminal device, or a server, or a processor with computing functions that is a combination of a terminal device and a server, which is not specifically limited in the present disclosure.

Figure 2:
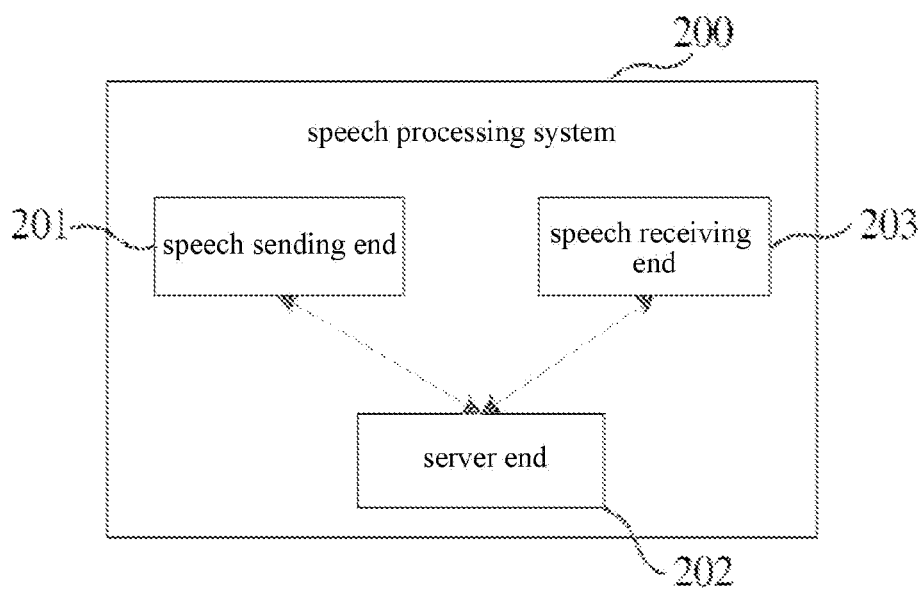
FIG. 2 schematically illustrates a structural diagram of a speech processing system according to an embodiment of the present disclosure.

In addition, FIG. 2 illustrates a schematic diagram of a structure of a speech processing system. As shown in FIG. 2, the speech processing system 200 includes a speech sending end 201, a server end 202, and a speech receiving end 203.

Specifically, the speech sending end 201 generates a speech sequence by recording the user's speech message in real time and sends the speech sequence to the server end 202.

After receiving the speech sequence from the speech sending end 201, the server end 202 will send a feedback message to the speech sending end 201 about the success of the reception, and send the speech sequence to the speech receiving end 203.

After receiving the speech sequence from the server end 202, the speech receiving end 203 will send a feedback message to the server end about the success of the reception, and play the speech sequence through a speech playback interface.

Here, the speech processing method of the present disclosure can be applied to the speech sending end 201, can be applied to the server end 202, or can also be applied to the speech receiving end 203, without any specific limitation in the present disclosure. Moreover, a speech processing apparatus of the present disclosure can be configured in the speech sending end 201, the server end 202 or the speech receiving end 203, without any specific limitation in the present disclosure.

In order to make the technical solutions of the present disclosure clearer, each step of the speech processing method is described as follows.

In step S110, a speech sequence is acquired, a plurality of speech sub-sequences are obtained by performing framing processing on the speech sequence and a target feature of each speech sub-sequence is extracted.

In exemplary embodiments of the present disclosure, the speech sequence includes a real-time speech sequence or a non-real-time speech sequence. The real-time speech sequence may be a speech sequence of a user in a live streaming recorded by a user terminal, or a speech sequence of a user in a web conference recorded by a user terminal, or a speech sequence of a user in a group chat recorded by a user terminal, which is not specifically limited in the present disclosure. In addition, the non-real-time speech sequence may be a speech sequence of a user that has been recorded by a user terminal, which is not specifically limited in the present disclosure.

In exemplary embodiments of the present disclosure, the speech sequence includes a unique identification of the user terminal corresponding to the speech sequence, and further includes speech information, and a time series which corresponds to the speech information in the speech sequence.

In exemplary embodiments of the present disclosure, the target feature may include a Mel Frequency Cepstrum Coefficient (MFCC) feature, a Linear Prediction Cepstrum Coefficient (LPCC) feature, a Linear Spectrum Frequency (LSF) feature, and may also include one or more of the speech features having the original information in the speech sequence, such as Mel Spectrogram feature, which is not specifically limited by the present disclosure. The present disclosure is illustrated by taking the Mel Spectrogram feature as an example.

In exemplary embodiments of the present disclosure, pre-emphasis processing of the speech sequence is further required prior to framing the speech sequence. According to the speech processing method in the present disclosure, a high-frequency part of the speech sequence is pre-emphasized to remove the lip-radiation effect, which increases the high-frequency resolution of the speech sequence and improves the efficiency of speech processing.

In exemplary embodiments of the present disclosure, after the pre-emphasis processing of the speech sequence, the pre-emphasized speech sequence is framed according to a predetermined frame length and a predetermined frame offset to obtain a plurality of speech sub-sequences. The predetermined frame length is greater than the predetermined frame offset, and the predetermined frame length and the predetermined frame offset can be set according to the actual situation. For example, the predetermined frame length can be set to 25 ms and the predetermined frame offset can be set to 10 ms. Of course, the predetermined frame length and the predetermined frame offset can also be customized, which is not specifically limited by the present disclosure.

In exemplary embodiments of the present disclosure, extracting the target feature of each speech sub-sequence includes: calculating speech energy and a Mel-filter parameter corresponding to each speech sub-sequence; and obtaining the target feature of each speech sub-sequence by a dot product between the speech energy and the Mel-filter parameter of each speech sub-sequence.

In particular, calculating the speech energy corresponding to each speech sub-sequence includes: performing windowing processing on each speech sub-sequence and obtaining a Fourier parameter of each speech sub-sequence by performing a Fourier transform on the windowed speech sub-sequence; and calculating the speech energy of each speech sub-sequence according to the Fourier parameter of each speech sub-sequence.

In addition, calculating the Mel-filter parameter corresponding to each speech sub-sequence includes: obtaining a Mel frequency of each speech sub-sequence by performing a mapping transformation in a Mel frequency domain for each speech sub-sequence, and calculating the Mel-filter parameter corresponding to each speech sub-sequence according to the Mel frequency of each speech sub-sequence.

Figure 3:
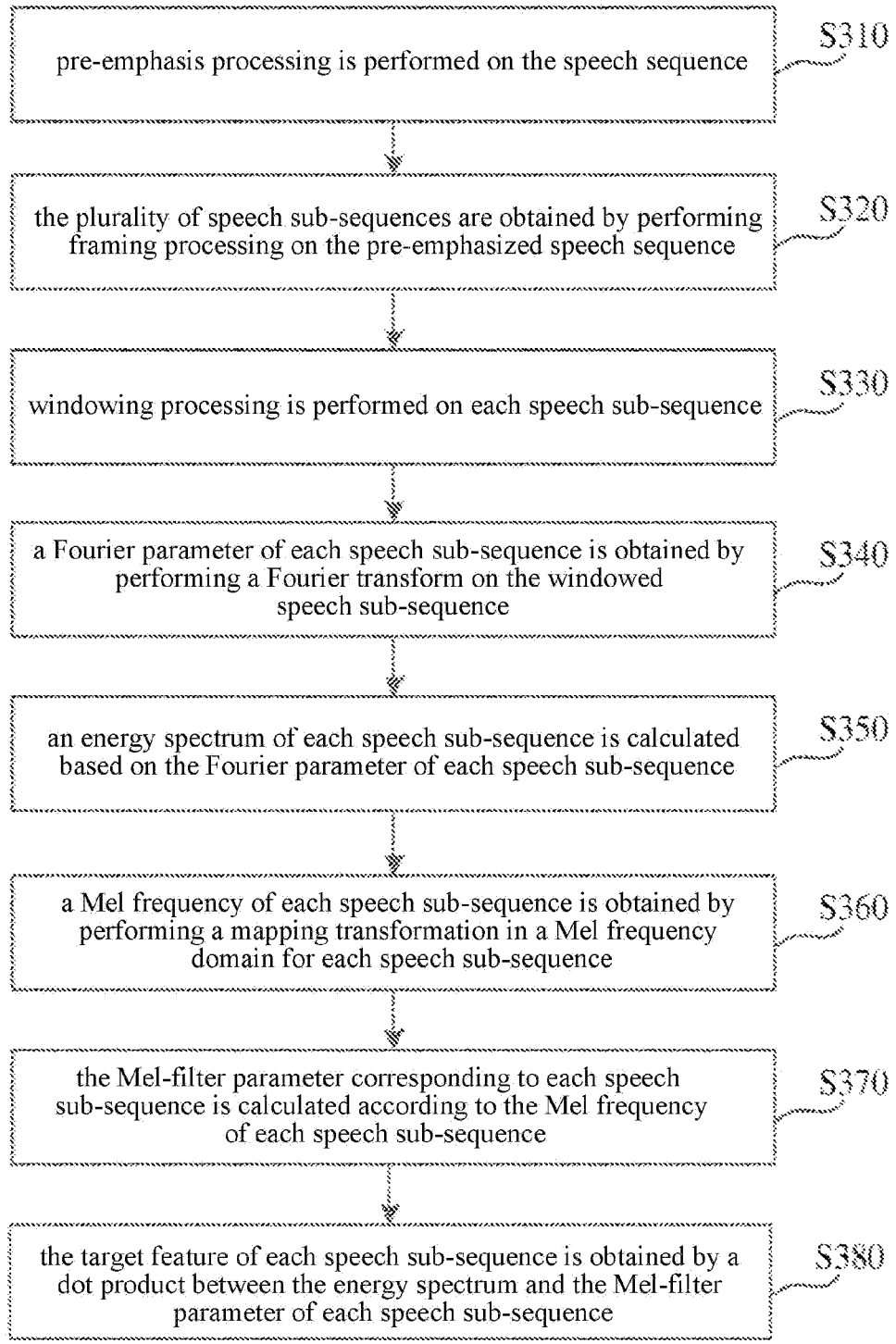
FIG. 3 schematically illustrates a flow chart of a method for extracting a target feature in a speech sequence according to an embodiment of the present disclosure.

For example, FIG. 3 illustrates a schematic diagram of a process for extracting the target feature in the speech sequence in the exemplary embodiments of the present disclosure. As shown in FIG. 3, the process includes at least steps S310 to S380 which are described in detail below.

In step S310, pre-emphasis processing is performed on the speech sequence.

In exemplary embodiments of the present disclosure, the speech is pre-emphasized using Formula (1) to increase the high frequency resolution of the speech sequence, and Formula (1) is shown below.

$$H(z)=1-\alpha z^{-1} \quad (1)$$

Here, $H(z)$ represents the speech sequence after the pre-emphasis processing; $\alpha$ represents a pre-emphasis coefficient, where $0.9<\alpha<1.0$, e.g., $\alpha=0.98$; and z represents the speech sequence.

In step S320, the plurality of speech sub-sequences are obtained by performing framing processing on the pre-emphasized speech sequence.

In exemplary embodiments of the present disclosure, since the speech sequence has short-term stability, the speech sequence can be divided into a plurality of speech sub-sequences for processing. Specifically, based on a sampling rate and the number of bytes occupied by each sample point, the speech sequence is framed according to a predetermined frame length and a predetermined frame offset, with the predetermined frame length being larger than the frame offset, i.e., each frame of the speech sub-sequence after the pre-emphasis processing will have a section that overlaps with the other.

In step S330, windowing processing is performed on each speech sub-sequence.

In exemplary embodiments of the present disclosure, performing the windowing processing includes multiplying each speech sub-sequence with a window function. The window function can be Rectangular window, Hamming window and Hanning window, which can be selected according to the actual situation. For example, the Hamming window is selected for the windowing processing in this disclosure, and the window function corresponding to the Hamming window is Formula (2), which is shown below.

$$S_n = 0.54 - 0.46\cos\left(2\pi \frac{n}{N}\right), 0 \le n \le N \tag{2}$$

Here, $S_n$ represents the window function; n presents the current sample point, and N represents the length of the speech sequence.

In step S340, a Fourier parameter of each speech sub-sequence is obtained by performing a Fourier transform on the windowed speech sub-sequence.

In exemplary embodiments of the present disclosure, the Fourier transform is performed on the speech sub-sequence after the windowing processing, specifically, the Fourier transform is performed on the speech sub-sequence after the windowing processing is performed using Formula (3), which is shown below.

$$S_i(k) = \sum_{n=1}^{N} S_i(n)h(n)\cos\left(\frac{2\pi kn}{N}\right) - j\sum_{n=1}^{N} S_i(n)h(n)\sin\left(\frac{2\pi kn}{N}\right) \tag{3}$$

Here, $S_i(k)$ represents the Fourier parameter, k represents k components after the Fourier transform, $S_i(n)$ represents the sample amplitude, and h(n) represents the speech sub-sequence after the windowing processing (windowed speech sub-sequence).

In step S350, an energy spectrum of each speech sub-sequence is calculated based on the Fourier parameter of each speech sub-sequence.

In exemplary embodiments of the present disclosure, based on the Fourier parameter of each speech sub-sequence, the modulus length of the Fourier parameter is calculated. The modulus length of the Fourier parameter is the corresponding speech energy of each speech sub-sequence. In particular, the energy spectrum of each speech sub-sequence is calculated using Formula (4), which is shown below.

$$E_i = \sqrt{\left(\sum_{n=1}^{N} S_i(n)h(n)\cos\left(\frac{2\pi kn}{N}\right)\right)^2 + \left(\sum_{n=1}^{N} S_i(n)h(n)\sin\left(\frac{2\pi kn}{N}\right)\right)^2} \tag{4}$$

Here, $E_i$ represents the speech energy spectrum of the speech sub-sequence.

In step S360, a Mel frequency of each speech sub-sequence is obtained by performing a mapping transformation in a Mel frequency domain for each speech sub-sequence.

In exemplary embodiments of the present disclosure, a mapping transformation of the spectrum of each speech sub-sequence is performed in a Mel frequency domain. In particular, the mapping transformation of the spectrum of each speech sub-sequence is performed using Formula (5), which is shown below.

$$mel = 2595 \times \lg\left(1 + \frac{f}{700}\right) \tag{5}$$

Here, $f$ represents the frequency of each speech sub-sequence; and mel represents the Mel frequency of each speech sub-sequence.

In step S370, the Mel-filter parameter corresponding to each speech sub-sequence is calculated according to the Mel frequency of each speech sub-sequence.

In exemplary embodiments of the present disclosure, the Mel-filter parameter corresponding to each speech sub-sequence is calculated based on the frequency, the Mel frequency, and Mel-filter frequency of each speech sub-sequence. In particular, the Mel-filter parameter of each speech sub-sequence is calculated using Formula (6), which is shown below.

$$H_m(k) = \begin{cases} 0, & k < f(m-1) \\ \frac{2(k - f(m-1))}{(f(m+1) - f(m-1))(f(m) - f(m-1))}, & f(m-1) \le k \le f(m) \\ \frac{2(f(m+1) - k)}{(f(m+1) - f(m-1))(f(m) - f(m-1))}, & f(m) \le k \le f(m+1) \\ 0, & k \ge f(m+1) \end{cases} \tag{6}$$

Here, $H_m(k)$ represents the Mel-filter parameter, $f(x)$ represents the Mel-filter frequency, k represents the above-mentioned Mel frequency, and m represents the $m^{th}$ speech sub-sequence.

In step S380, the target feature of each speech sub-sequence is obtained by a dot product between the energy spectrum and the Mel-filter parameter of each speech sub-sequence.

In exemplary embodiments of the present disclosure, the target feature of each speech sub-sequence is obtained using Formula (7), which is shown below.

$$M = E_i \cdot H_m(k) \tag{7}$$

Here, M represents the target feature of the speech sub-sequence.

Continuing to refer to FIG. 1, in step S120, each speech sub-sequence is detected by the speech detection model according to each target feature, and the valid speech is determined based on the detection result.

In exemplary embodiments of the present disclosure, since the speech sub-sequence contains other noise such as ambient noise, it is necessary to detect each speech sub-sequence to determine the valid speech that does not contain the noise. Specifically, according to embodiments of the present disclosure, two methods for detecting each speech sub-sequence are proposed, and the details of the two methods are described as follows.

The first method includes detection by signal-to-noise ratio (SNR).

Figure 4:
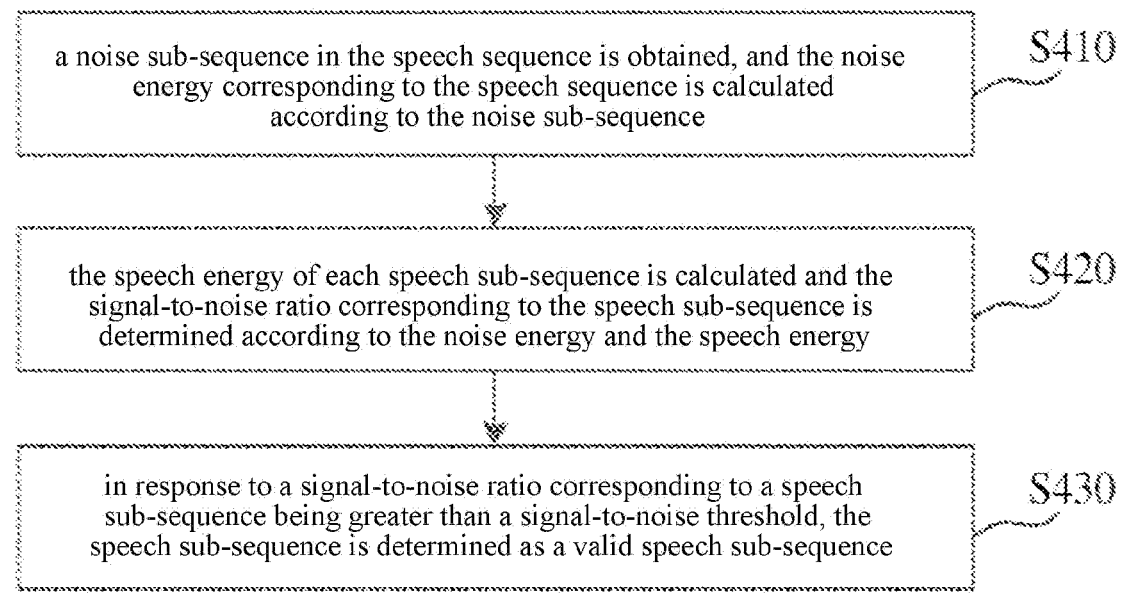
FIG. 4 schematically illustrates a flow chart of a signal-to-noise ratio (SNR) detection method according to an embodiment of the present disclosure.

In exemplary embodiments of the present disclosure, FIG. 4 illustrates a schematic diagram of a process for SNR detection. As shown in FIG. 4, this process includes at least steps S410 to S430, as described in detail below.

In step S410, a noise sub-sequence in the speech sequence is obtained, and the noise energy corresponding to the speech sequence is calculated according to the noise sub-sequence.

In exemplary embodiments of the present disclosure, the first predetermined number of speech sub-sequences of the speech sequence is used as initial noise subsequences, and the speech energy of the initial noise subsequences is calculated as the initial noise energy.

In particular, the first predetermined number can be set according to the actual situation. For example, in a web conference, the user does not speak instantly for a period of time after being connected to the network, and the speech captured during this period can be used as noise speech. The first 10 ms of the speech sequence can be used as the noise sub-sequences, and the first 3 speech sub-sequences can also be used as the noise sub-sequences, and the predetermined number can be increased or decreased according to the actual application scenario, which is not limited by the present disclosure.

In addition, the speech energy of the speech sub-sequence is calculated using Formula (8), which is shown below.

$$A = \sum_{n=1}^{N} S_n^2 \quad (8)$$

Here, A represents the speech energy of the speech sub-sequence or the noise energy of the noise sub-sequence, and $S_n$ represents the value of the speech sample point.

In exemplary embodiments of the present disclosure, since the noise energy varies with the duration of the speech, the initial noise energy needs to be updated in real time to obtain the noise energy. The method for obtaining the noise energy includes: acquiring a time series corresponding to the speech sequence, and iteratively updating the noise energy based on the time series, the initial noise energy, and speech energy corresponding to the speech sequence.

Figure 5:
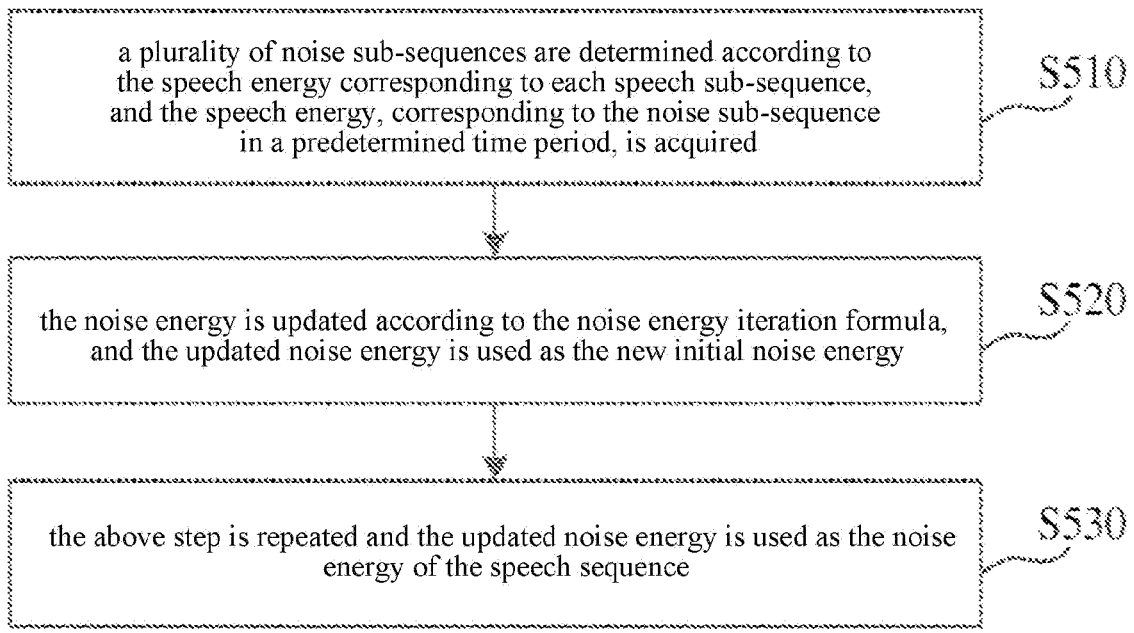
FIG. 5 schematically illustrates a flow chart of a method for obtaining noise energy corresponding to a speech sequence according to an embodiment of the present disclosure.

Specifically, FIG. 5 illustrates a schematic diagram of a process for obtaining the noise energy corresponding to a speech sequence. As shown in FIG. 5, this process includes at least steps S510 to S530, as described in detail below.

In step S510, a plurality of noise sub-sequences are determined according to the speech energy corresponding to each speech sub-sequence, and the speech energy, corresponding to each noise sub-sequence in a predetermined time period, is acquired.

In exemplary embodiments of the present disclosure, it is determined whether the speech energy corresponding to each speech sub-sequence is less than the energy threshold, and when the speech energy corresponding to a speech sub-sequence is less than the energy threshold, the speech sub-sequence is determined to be a noise sub-sequence. The energy threshold can be set according to the actual speech environment, which is not specifically limited by this disclosure.

In addition, the predetermined time period is set according to the actual situation, for example, the predetermined time period may be 1 minute. That is, the speech energies corresponding to all the noise sub-sequences within 1 minute is obtained, and the noise energy is updated according to the speech energies of all noise sub-sequences within 1 minute. Of course, the predetermined time period may also be 30 seconds, which is not specifically limited by this disclosure. In this disclosure, a predetermined time period of 1 minute is used as an example, and it is assumed that there are 10 noise sub-sequences within 1 minute.

In step S520, the noise energy is updated according to the noise energy iteration formula, and the updated noise energy is used as the new initial noise energy. In particular, the noise energy iteration formula is shown in Formula (9) below.

$$A' = (1-\beta)A' + \beta \min\{A'_1, \ldots, A'_{10}\}. \quad (9)$$

Here, A' represents the updated noise energy, and $\beta$ represents the weight parameter. The weight parameter can be set according to the actual situation, for example, the value of $\beta$ is in the range from 0 to 1, which is not specifically limited by this disclosure. $A'_1$ represents the initial noise energy, $A'_{10}$ represents the speech energy corresponding to the $10^{th}$ noise sub-sequence, and min ($E'_1, \ldots E'_{10}$) represents the smallest speech energy among the speech energies corresponding to the 10 noise sub-sequences.

In step S530, the above step is repeated and the updated noise energy is used as the noise energy of the speech sequence.

In exemplary embodiments of the present disclosure, the noise energy is continuously updated iteratively according to the time series corresponding to the speech sequence. According to the present disclosure, the noise energy is updated in real time, which ensures the effectiveness of speech detection and improves the efficiency of speech processing.

Continuing to refer to FIG. 4, in step S420, the speech energy of each speech sub-sequence is calculated and the signal-to-noise ratio corresponding to the speech sub-sequence is determined according to the noise energy and the speech energy.

In exemplary embodiments of the present disclosure, the signal-to-noise ratio corresponding to each speech sub-sequence is calculated using Formula (10), which is shown below.

$$SNR = \left(\frac{A}{A'}\right)^2 \quad (10)$$

Here, SNR represents the signal-to-noise ratio.

In addition, the speech energy of each speech sub-sequence is calculated by Formula (8) in the above embodiments, and since the speech energy calculation has been described in detail according to the above embodiments, it will not be repeated here.

In step S430, in response to a signal-to-noise ratio corresponding to a speech sub-sequence being greater than a signal-to-noise threshold, the speech sub-sequence is determined as a valid speech sub-sequence.

In exemplary embodiments of the present disclosure, it is determined whether the signal-to-noise ratio of each speech sub-sequence is greater than the signal-to-noise ratio threshold. If a signal-to-noise ratio of a speech sub-sequence is greater than the signal-to-noise ratio threshold, the speech sub-sequence is determined as a valid speech sub-sequence. If a signal-to-noise ratio of a speech sub-sequence is equal to or less than the signal-to-noise ratio threshold, the speech sub-sequence is determined as a non-valid speech sub-sequence. The signal-to-noise ratio threshold can be set according to the actual situation, or can be calculated according to the Equal Error Rate (EER), which is not limited by the present disclosure.

The second method includes detecting each speech sub-sequence by a speech detection model.

In exemplary embodiments of the present disclosure, the speech detection model includes a neural network model, for example, the speech detection model includes a two-layer Long Short Term Memory (LSTM) neural network. The two-layer LSTM neural network is an improved recurrent neural network divided into input gate, output gate, and forget gate, using gate units to choose to forget and remember some information. The speech detection model may also include other neural networks such as Convolutional Neural Network (CNN), Recurrent Neural Network (RNNR), etc., which is not specifically limited by the present disclosure. In addition, the speech detection model may also include a softmax layer.

In exemplary embodiments of the present disclosure, detecting each speech sub-sequence by a speech detection model according to each target feature, includes: obtaining a target probability of a speech sub-sequence corresponding to each target feature by inputting each target feature into the speech detection model for feature extraction; and determining, in response to a target probability of a speech sub-sequence being greater than a first probability threshold, the speech sub-sequence as a valid speech sub-sequence; or determining, in response to a target probability of a speech sub-sequence being equal to or less than a first probability threshold, the speech sub-sequence as a non-valid speech sub-sequence. Here, the target probability includes the probability that the speech sub-sequence is a valid speech, and the above first probability threshold can be set according to the actual situation, which is not specifically limited by the present disclosure.

In exemplary embodiments of the present disclosure, before detecting each speech sub-sequence by the speech detection model according to each target feature, it is necessary to train a candidate speech detection model corresponding to the speech detection model.

Specifically, FIG. 6 illustrates a schematic diagram of a process for training a candidate speech detection model. As shown in FIG. 6, this process includes at least steps S610 to S630, as described in detail below.

In step S610, a plurality of speech sequence samples are obtained. The plurality of speech sequence samples include valid speech samples and non-valid speech samples.

In exemplary embodiments of the present disclosure, the valid speech sample may be a collected human voice sample, the non-valid speech sample may be a collected environmental noise sample, and it may also be a collected car noise sample, which is not specifically limited by the present disclosure.

In step S620, a first tagging information sample of each speech sequence sample is obtained by tagging each valid speech sample and each non-valid speech sample.

In exemplary embodiments of the present disclosure, each valid speech sample and each non-valid speech sample are tagged with labels of different categories, and each piece of label information is used as a first tagging information sample. For example, each valid speech sample is tagged with a first label, and each non-valid speech sample is tagged with a second label, the first label being different from the second label. In addition, the number of valid speech samples and the number of non-valid speech samples may be the same or different, which is not specifically limited by the present disclosure.

In step S630, each speech sequence sample and a corresponding first tagging information sample thereof are input to a candidate speech detection model, and the speech detection model is obtained by training the candidate speech detection model according to each speech sequence sample and the corresponding first tagging information sample thereof.

In exemplary embodiments of the present disclosure, a plurality of valid speech samples and a plurality of non-valid speech samples are randomly scrambled, and the scrambled speech sequence samples are input to the candidate speech detection model.

In exemplary embodiments of the present disclosure, each speech sequence sample is input to the candidate speech detection model, and the feature extraction of the speech sequence sample is performed by the candidate speech detection model to obtain first tagging information corresponding to the speech sequence sample.

Specifically, the feature extraction of the speech sequence sample is performed by the speech detection model to obtain the probability of the speech sequence sample being valid speech, and if the probability of the speech sequence sample being valid speech is greater than the first probability threshold, the speech sequence sample is tagged with a first label; or if the probability of the speech sequence sample being valid speech is equal to or less than the first probability threshold, the speech sequence sample is tagged with a second label. The label information of each speech sequence sample is used as the first tagging information.

In exemplary embodiments of the present disclosure, based on the first tagging information and the first tagging information sample, the speech detection model is optimized by back propagation algorithm. Specifically, a first loss function is determined based on the first tagging information and the first tagging information sample, and the speech detection model is obtained by adjusting the parameter of the candidate speech detection model until the first loss function is minimized. The first loss function may be the Smoothing cross-entropy function, the AAMSoftmax loss function, or other loss functions, which are not specifically limited by the present disclosure.

In exemplary embodiments of the present disclosure, the valid speech sub-sequence may be obtained using the detection method by signal-to-noise ratio, the valid speech sub-sequence may be obtained using the detection method by speech detection model, or both detection methods by signal-to-noise ratio and by speech detection model may be used. For example, a set of first valid speech sub-sequences is obtained using the detection method by signal-to-noise ratio, a set of second valid speech sub-sequences is obtained using the detection method by speech detection model, and the final valid speech sub-sequences are obtained by the union of the set of first valid speech sub-sequences and the set of second valid speech sub-sequences. The detection process of obtaining the first valid speech sub-sequences and the detection process of obtaining the second valid speech sub-sequences can be performed simultaneously or not, which is not specifically limited by the present disclosure.

Figure 7:
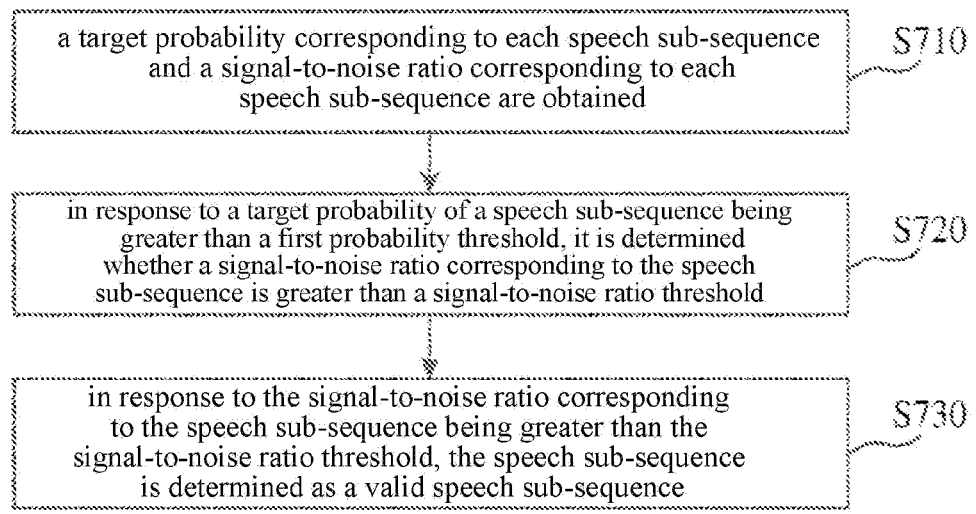
FIG. 7 schematically illustrates a flow chart for determining a valid voice sub-sequence according to an embodiment of the present disclosure.

In exemplary embodiments of the present disclosure, FIG. 7 illustrates a schematic diagram of a process for determining a valid speech sub-sequence. As shown in FIG. 7, in step S710, a target probability corresponding to each speech sub-sequence and a signal-to-noise ratio corresponding to each speech sub-sequence are obtained; in step S720, in response to a target probability of a speech sub-sequence being greater than a first probability threshold, it is determined whether a signal-to-noise ratio corresponding to the speech sub-sequence is greater than a signal-to-noise ratio threshold; in step S730, in response to the signal-to-noise ratio corresponding to the speech sub-sequence being greater than the signal-to-noise ratio threshold, the speech sub-sequence is determined as a valid speech sub-sequence.

In exemplary embodiments of the present disclosure, determining the valid speech based on the detection result includes: obtaining a plurality of groups of consecutive speech sequences by performing a sliding window operation on the speech sequence. A window length of the sliding window operation is greater than a window offset, and the window length and the window offset are set according to actual situation. For example, the window length may be 20 frames and the window offset may be 10 frames, which is not specifically limited by the present disclosure.

In particular, the sliding window operation includes that: firstly, based on the speech sequence, the first frame of the speech sequence is used as the starting point for sliding window, and the window length is used as the length for sliding window to obtain one group of consecutive speech sequences; and then, in each slide of sliding window, the window offset is used as a fixed step to slide, and a group of consecutive speech sequences is acquired for each slide of the sliding window. Each group of consecutive speech sequences includes a plurality of speech sub-sequences, and there are duplicate speech sub-sequences in adjacent groups of consecutive speech sequences.

Further, since in the description of the above embodiments, the validity of each speech sub-sequence has been detected and the detection result that each speech sub-sequence is a valid speech sub-sequence or a non-valid speech sub-sequence has been obtained, a number of valid speech sub-sequences in each group of consecutive speech sequences can be obtained based on the above-mentioned detection result made for each speech sub-sequence. If the number of valid speech sub-sequences in one group of consecutive speech sequences is greater than the number threshold, the group of consecutive speech sequences is determined as the valid speech. If the number of valid speech sub-sequences in one group of consecutive speech sequences is equal to or less than the number threshold, the group of consecutive speech sequences is determined as the non-valid speech.

The number threshold can be set according to the actual situation, e.g., it can be set based on the ratio of the window offset to the window length. If the window length is 20 frames and the window offset is 10 frames, the ratio of the window offset to the window length is 0.5, and the proportion of the valid speech can be set to 0.5, then the number threshold can be set to 10. That is, if there are more than 10 speech sub-sequences in one group of the consecutive speech sequences being the valid speech sub-sequences, the consecutive speech sequences in this group are valid. Of course, the number threshold can be set to 8 or 12, which is not specifically limited by the present disclosure.

Continuing to refer to FIG. 1, in step S130, a target feature corresponding to the valid speech is input into a voiceprint recognition model, and target speech is screened out from the valid speech by the voiceprint recognition model.

In exemplary embodiments of the present disclosure, the voiceprint recognition model can be used to extract the representation feature vector of the speech sub-sequence corresponding to the valid speech, and the different representation feature vectors corresponding to respective users are used to distinguish whether the speech sub-sequence is from the user herself/himself or not, and the speech from the user herself/himself is used as the target speech.

Figure 8:
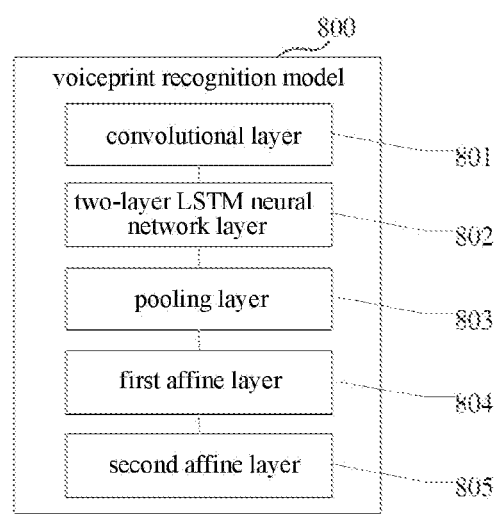
FIG. 8 schematically illustrates a schematic diagram of a structure of a voiceprint recognition model according to an embodiment of the present disclosure.

In particular, FIG. 8 illustrates a schematic diagram of a structure of a voiceprint recognition model 800. As shown in FIG. 8, the voiceprint recognition model 800 includes a convolutional layer 801, a two-layer LSTM neural network layer 802, a pooling layer 803, a first affine layer 804, and a second affine layer 805. The convolutional layer 801 may be a multi-layered convolutional layer, first affine layer 804, and second affine layer 805. The first affine layer may be a multi-layer affine transformation layer, and the second affine layer 805 may be a classification affine layer. The voiceprint recognition model 800 may also include a softmax layer, which is not specifically limited by the present disclosure.

In exemplary embodiments of the present disclosure, the target feature corresponding to the valid speech is used as a valid target feature, and the valid target feature is input into the voiceprint recognition model 800 for feature extraction to obtain a speech representation vector of the valid speech sub-sequence corresponding to the valid target feature.

In exemplary embodiments of the present disclosure, obtaining the speech representation vector of the valid speech sub-sequence corresponding to the valid target feature by inputting the valid target feature into the voiceprint recognition model 800 for feature extraction, includes: inputting the valid target feature into the voiceprint recognition model 800, and obtaining a deep feature of the valid target feature by performing feature extraction on the valid target feature sequentially using the convolutional layer and the double-layer LSTM layer, where the deep feature includes time dimension and feature dimension; obtaining a maximum feature and a mean feature of the deep feature in the time dimension by inputting the deep feature into the pooling layer for feature extraction, and obtaining a hidden layer feature by summing the maximum feature and the mean feature; and obtaining the speech representation vector of the valid speech sub-sequence by inputting the hidden layer feature into the first affine layer for affine transformation.

In particular, inputting each valid target feature into the voiceprint recognition model 800 includes that: each valid target feature is firstly input into the convolutional layer 801, and the feature extraction is performed on each valid target feature by the convolutional layer 801 using the convolution kernel to obtain a first speech feature corresponding to each valid target feature. The size of the convolution kernel is set according to the actual situation, which is not specifically limited by the present disclosure.

Then, each first speech feature is input into the two-layer LSTM neural network layer 802, and the deep feature corresponding to each first speech feature is obtained by performing feature extraction on each first speech feature through the two-layer LSTM layer 802. The deep feature includes the time dimension and the feature dimension.

After that, each deep feature is input into the pooling layer 803, the feature extraction in time dimension is performed on the deep feature through the pooling layer 803 to extract the maximum feature and mean feature of the deep feature in time dimension, and then the maximum feature and mean feature are summed to obtain the hidden layer feature on only the feature dimension.

Finally, each hidden layer feature is input to the first affine layer 804, and the feature extraction of each hidden layer feature is performed by the first affine layer 804 to obtain the speech representation vector corresponding to each hidden layer feature.

In addition, the voiceprint recognition model 800 can also be used to feed the speech representation vector into the second affine layer for feature extraction and feed the result of the feature extraction into the softmax layer to obtain the probability for each valid speech sequence sample to be the target speech. This step is crucial in training the candidate voiceprint recognition model to obtain the voiceprint recognition model, but may not be used in screening the target speech using the application of the voiceprint recognition model.

Figure 9:
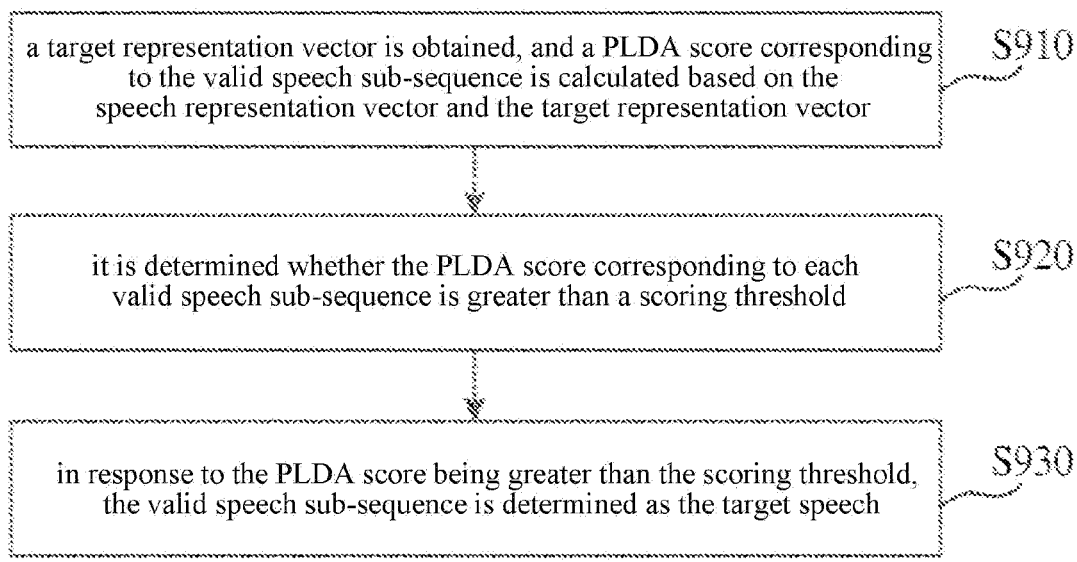
FIG. 9 schematically illustrates a flow chart of a method for screening target speech according to an embodiment of the present disclosure.

In exemplary embodiments of the present disclosure, after obtaining the speech representation vector corresponding to each valid speech sub-sequence, the target representation vector corresponding to the speech sequence of the target user is obtained. FIG. 9 illustrates a schematic diagram of a process of screening the target speech. As shown in FIG. 9, the process of screening the target speech includes at least steps S910 to S930, which are described in detail as follows.

In step S910, a target representation vector is obtained, and a Probabilistic Linear Discriminant Analysis (PLDA) score corresponding to the valid speech sub-sequence is calculated based on the speech representation vector and the target representation vector.

In exemplary embodiments of the present disclosure, the PLDA score is used to calculate the similarity between the speech representation vector and the target representation vector. That is, the PLDA score can be used to determine whether the valid speech is produced by the target user. The higher the PLDA score, the greater the probability that the valid speech is produced by the target user, and the lower the PLDA score, the smaller the probability that the valid speech is produced by the target user.

The PLDA score corresponding to the valid speech sub-sequence is calculated using Formula (11), which is shown below.

$$\text{score} = \log \frac{p(\eta_1, \eta_2 | H_s)}{p(\eta_1 | H_d) p(\eta_2 | H_d)} \quad (11)$$

Here, score represents the PLDA score; $\eta_1$ and $\eta_2$ represent D-Vector of the speech representation vector and D-Vector of the target representation vector, respectively; $p(\eta_1, \eta_2 | H_s)$ represents the likelihood function that the speech representation vector and the target representation vector are from the same space; and $p(\eta_1 | H_d)$ and $p(\eta_2 | H_d)$ represent the likelihood functions of the speech representation vector and the target representation vector from different spaces, respectively.

In step S920, it is determined whether the PLDA score corresponding to each valid speech sub-sequence is greater than a scoring threshold.

In exemplary embodiments of the present disclosure, the scoring threshold may be set according to the actual situation, or may be obtained by EER calculation, which is not specifically limited by the present disclosure.

In step S930, in response to the PLDA score being greater than the scoring threshold, the valid speech sub-sequence is determined as the target speech.

In exemplary embodiments of the present disclosure, when the PLDA score corresponding to a valid speech sub-sequence is greater than the scoring threshold, the valid speech sub-sequence is determined as a target speech sub-sequence, and a plurality of target valid speech sub-sequences are composed of the target speech.

In exemplary embodiments of the present disclosure, when the speech processing method is applied to the speech sending end 201, the speech sending end 201 sends the target speech to the server end 202 to cause the server end 202 to forward the target speech to one or more speech receiving end 203; when the speech processing method is applied to the server end 202, the server end 202, after receiving the speech sequence from the speech sending end 201, obtains the target speech using the speech processing method and sends the target speech to one or more speech receiving end 203; and when the speech processing method is applied to the speech receiving end 203, the speech receiving end 203 broadcasts the target speech obtained after processing by the speech processing method through the broadcast interface.

In addition, there are two methods to obtain the target representation vector corresponding to the speech sequence of the target user, which are described in detail as follows.

In the first method, the speech sequence registered by the target user is used to obtain the target representation vector.

In exemplary embodiments of the present disclosure, the speech sequence registered by the target user at the corresponding target user terminal is obtained, and based on the registered speech sequence, the representation vector of the registered speech sequence is obtained using the speech processing method in the above embodiments. If multiple speech sequences registered by the target user are obtained, the average representation vector corresponding to the multiple registered speech sequences can be obtained as the target representation vector.

In particular, the registered speech sequence is obtained, the registered speech sequence is framed to obtain a plurality of registered speech sub-sequences, and a registered target feature of each registered speech sub-sequence is extracted; and each registered target feature is input into the voiceprint recognition model 800, and the target representation vector corresponding to the registered speech sequence is obtained by the voiceprint recognition model 800.

The process of extracting the registered target feature of each registered speech sub-sequence and obtaining the target representation vector has been described in detail in the above mentioned embodiments and will not be repeated here.

In the second method, the target representation vector is calculated iteratively using the valid speech and the PLDA score corresponding to the valid speech.

Figure 10:
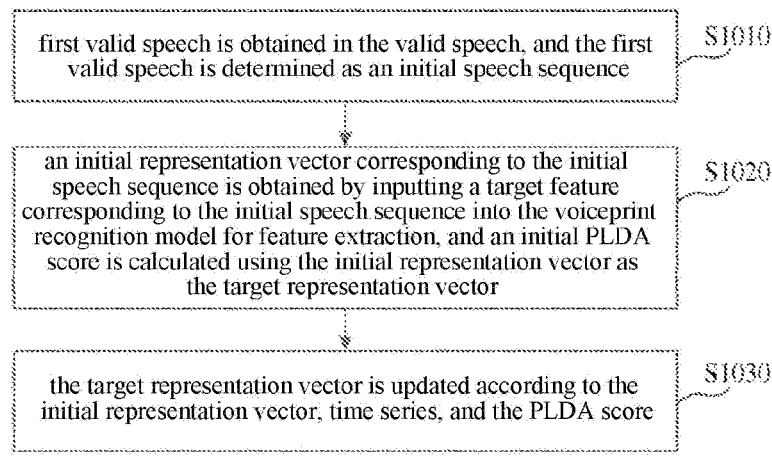
FIG. 10 schematically illustrates a flow chart of a method for calculating a target representation vector according to an embodiment of the present disclosure.

In exemplary embodiments of the present disclosure, FIG. 10 illustrates a schematic diagram of a process for calculating the target representation vector. As shown in FIG. 10, the process for calculating the target representation vector includes at least steps S1010 to S1030, as described in detail below.

In step S1010, first valid speech is obtained in the valid speech, and the first valid speech is determined as an initial speech sequence.

In exemplary embodiments of the present disclosure, the first valid speech may be the first frame of valid speech sub-sequence in the valid speech, or may be the second frame of valid speech sub-sequence in the valid speech, which is not specifically limited by the present disclosure.

In step S1020, an initial representation vector corresponding to the initial speech sequence is obtained by inputting a target feature corresponding to the initial speech sequence into the voiceprint recognition model 800 for feature extraction, and an initial PLDA score is calculated using the initial representation vector as the target representation vector.

In exemplary embodiments of the present disclosure, the method of obtaining the initial representation vector and the method of calculating the PLDA score have been described in detail in the above embodiments and will not be repeated here.

In step S1030, the target representation vector is updated according to the initial representation vector, time series, and the PLDA score.

In exemplary embodiments of the present disclosure, the timestamp corresponding to the initial speech sequence and the current timestamp corresponding to the current valid speech sub-sequence are obtained in the time series. The updated representation vector is calculated according to the initial representation vector, the PLDA score corresponding to the initial representation vector, and a time difference between the timestamp corresponding to the initial representation vector and the current timestamp. The process for calculating the updated representation vector is shown in Formula (12) below.

$$V_n = (1 - \chi(T_n - T_{n-1}) - \delta S) * V_n + (\chi(T_n - T_{n-1}) + \delta S) * V_{n-1} \quad (12)$$

$V_n$ represents the updated representation vector; $V_{n-1}$ represents the initial representation vector; $T_n - T_{n-1}$ represents the time difference between the current timestamp and the timestamp corresponding to the initial speech sequence; S represents the PLDA score corresponding to the updated representation vector and the initial representation vector; $\chi$ represents the weight of the preset hyperparameter time; and $\delta$ represents the weight of the initial PLDA score.

Then, the updated representation vector is used as the new initial representation vector, and the previous step is repeated with the updated representation vector as the target representation vector.

In exemplary embodiments of the present disclosure, the target representation vector can be continuously updated in iterations according to the time series corresponding to the speech sequence. The present disclosure ensures the effectiveness of speech detection and improves the efficiency of speech processing by updating the target representation vector in real time.

Figure 11:
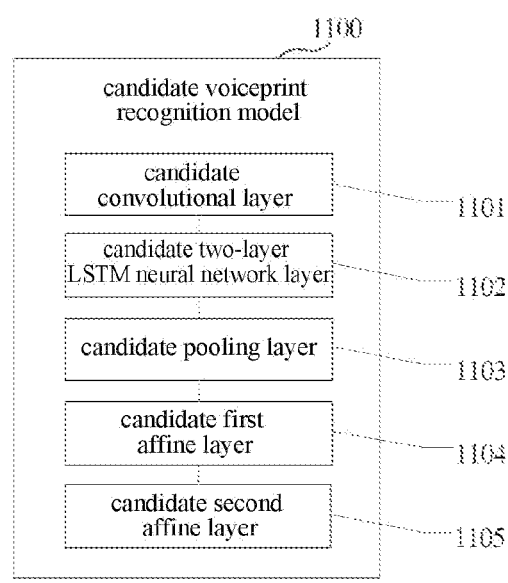
FIG. 11 schematically illustrates a schematic diagram of a structure of a candidate speech detection model according to an embodiment of the present disclosure.

In exemplary embodiments of the present disclosure, before screening out the target speech from the valid speech according to the voiceprint recognition model 800, a candidate voiceprint recognition model corresponding to the voiceprint recognition model 800 needs to be trained. FIG. 11 illustrates a schematic diagram of a structure of the candidate voiceprint recognition model. As shown in FIG. 11, the candidate voiceprint recognition model 1100 includes: a candidate convolutional layer 1101, a candidate two-layer LSTM neural network layer 1102, a candidate pooling layer 1103, a candidate first affine layer 1104, and a candidate second affine layer 1105.

Figure 12:
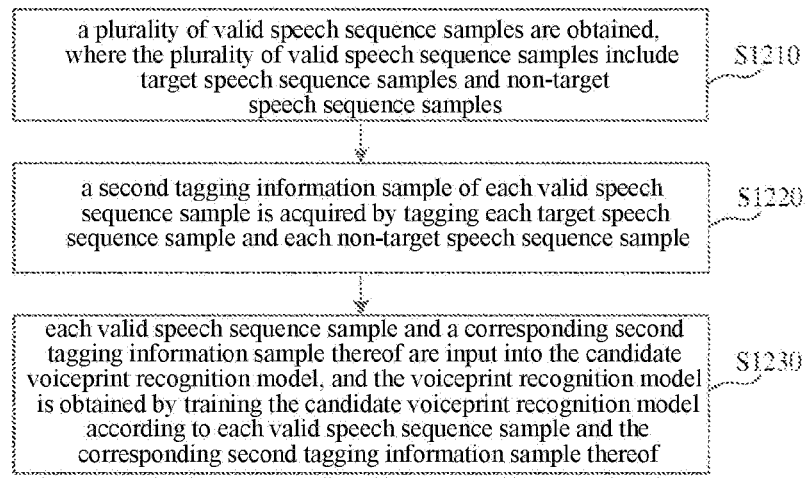
FIG. 12 schematically illustrates a flow chart of a method for training a candidate voiceprint recognition model according to an embodiment of the present disclosure.

In particular, FIG. 12 illustrates a schematic diagram of a process for training the candidate voiceprint recognition model 1100. As shown in FIG. 12, the process includes at least steps S1210 to S1230, as described in detail below.

In step S1210, a plurality of valid speech sequence samples are obtained. The plurality of valid speech sequence samples include target speech sequence samples and non-target speech sequence samples.

In exemplary embodiments of the present disclosure, the target speech sequence samples may be multiple segments of speech sequences collected from the target user, and the non-target speech sequence samples may be multiple segments of speech sequences collected from the non-target user.

In step S1220, a second tagging information sample of each valid speech sequence sample is acquired by tagging each target speech sequence sample and each non-target speech sequence sample.

In exemplary embodiments of the present disclosure, each target speech sample and non-target speech sample are tagged with labels of different categories, and each piece of label information is used as the second tagging information sample. For example, each target speech sample is tagged with a third label, and each non-target speech sample is tagged with a fourth label, the third label being different from the fourth label. In addition, the number of the target speech samples may be the same as or different from the number of non-target speech samples, which is not specifically limited by the present disclosure.

In step S1230, each valid speech sequence sample and a corresponding second tagging information sample thereof are input into the candidate voiceprint recognition model 1100, and the voiceprint recognition model 800 is obtained by training the candidate voiceprint recognition model 1100 according to each valid speech sequence sample and the corresponding second tagging information sample thereof.

In exemplary embodiments of the present disclosure, each valid speech sequence sample is input to the candidate voiceprint recognition model 1100, and feature extraction is performed on the valid speech sequence sample by the candidate voiceprint recognition model 1100 to obtain second tagging information corresponding to the valid speech sequence sample.

In particular, the feature extraction is performed on the valid speech sequence sample by the candidate voiceprint recognition model to obtain the probability of the valid speech sequence sample being the target speech. If the probability of the valid speech sequence sample being the target speech is greater than a second probability threshold, the valid speech sequence sample is tagged with the third label. If the probability of the valid speech sequence sample being the target speech is equal to or less than the second probability threshold, the valid speech sequence sample is tagged with the fourth label. The label information of each valid speech sequence sample is used as the second tagging information.

In addition, the process for performing feature extraction on the valid speech sequence sample by the candidate voiceprint recognition model specifically includes the following steps.

First, the target feature corresponding to each valid speech sequence sample is input to the candidate convolutional layer 1101 for feature extraction to obtain a second speech feature corresponding to each valid speech sequence sample.

Then, the second speech feature is input into the candidate two-layer LSTM neural network layer 1102 for feature extraction to obtain a deep feature corresponding to each second speech feature. The deep feature corresponding to each second speech feature includes the time dimension and the feature dimension.

Next, the deep feature corresponding to each second speech feature is input to the candidate pooling layer 1103, and feature extraction in time dimension is performed on the deep feature corresponding to the second speech feature by the candidate pooling layer 1103 to obtain a hidden layer feature corresponding to each second speech feature.

After that, the hidden layer feature corresponding to each second speech feature is input to the candidate first affine layer 1104, and the feature extraction is performed on the hidden layer feature corresponding to each second speech feature by the candidate first affine layer 1104 to obtain the speech representation vector corresponding to each second speech feature.

Finally, the speech representation vector corresponding to each second speech feature is input into the candidate second affine layer 1105 to obtain the target speech feature, and then the target speech feature is input into the softmax layer for normalization to obtain the probability of each valid speech sequence sample being the target speech. The target speech feature includes the probability feature that the valid speech sub-sequence is produced by the target user.

In exemplary embodiments of the present disclosure, a second loss function is determined based on the second tagging information and the second tagging information sample. The parameter of the candidate voiceprint recognition model 1100 is adjusted until the second loss function is minimized to obtain the voiceprint recognition model 800.

In particular, the voiceprint recognition model 800 is optimized by a back propagation algorithm based on the second tagging information and the second tagging information sample. Specifically, the second loss function is determined based on the second tagging information and the second tagging information sample, and the voiceprint recognition model 800 is obtained by adjusting the parameter of the candidate voiceprint recognition model 1100 until the second loss function is minimized. The second loss function may be the Smoothing cross-entropy function, the AAM-Softmax loss function, or other loss functions, which are not specifically limited by the present disclosure.

Continuing to refer to FIG. 1, in step S140, the target speech is controlled to be forwarded to other client.

In exemplary embodiments of the present disclosure, the speech sequence of the client is acquired, the target speech is obtained by processing the speech sequence using the speech processing method of the present disclosure, and the target speech is controlled to be forwarded to other client. The client and the other client can be clients in the same conference, and the target speech is forwarded to the other client by acquiring the client identification of the other client after obtaining the target speech.

Figure 13:
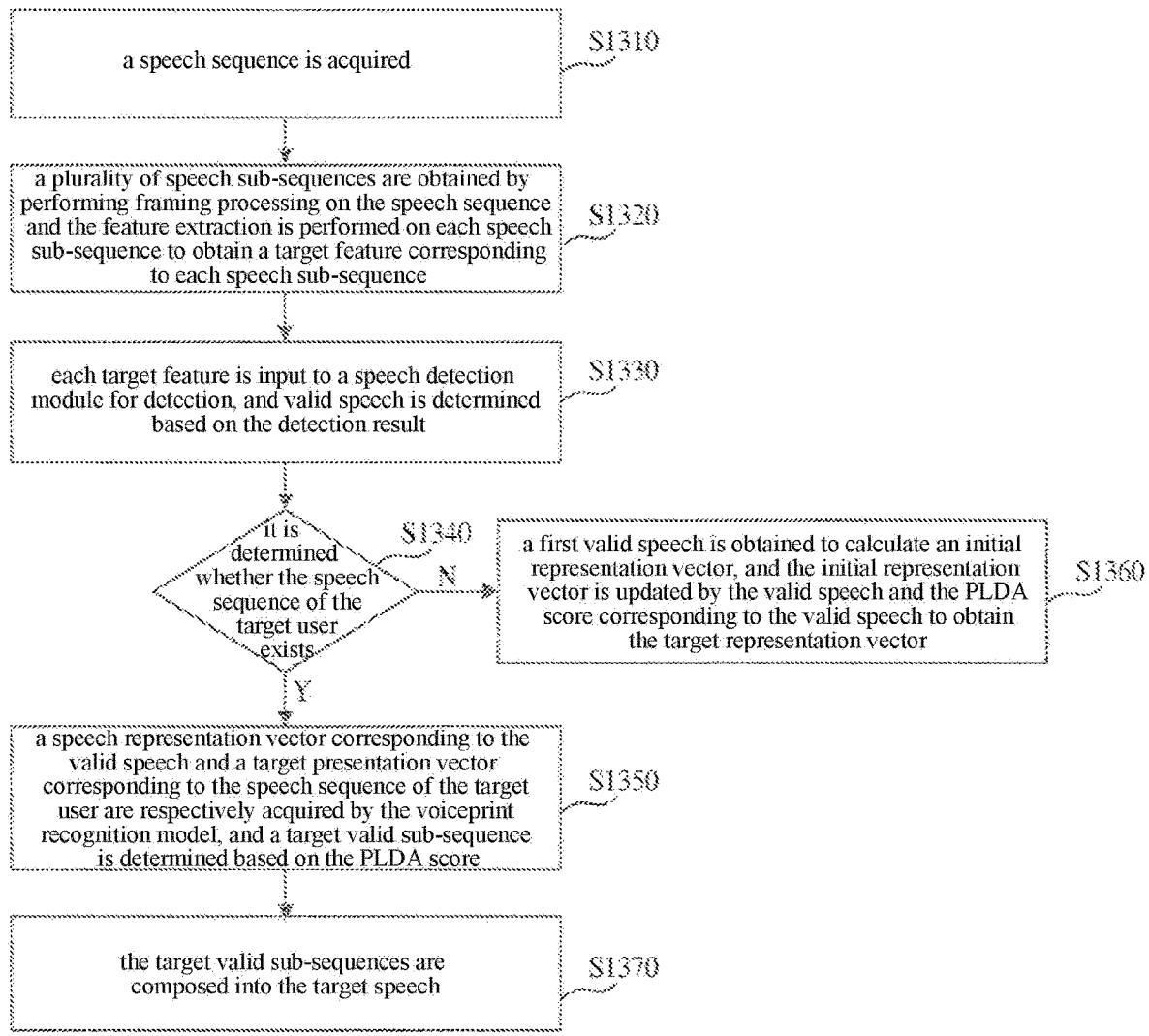
FIG. 13 schematically illustrates a flow chart of a speech processing method according to specific embodiments of the present disclosure.

FIG. 13 illustrates a schematic diagram of the speech processing method in a specific embodiment. As shown in FIG. 13, the progress of the speech processing method includes at least steps S1310 to S1370, as described in detail below.

In step S1310, a speech sequence is acquired. In step S1320, a plurality of speech sub-sequences are obtained by performing framing processing on the speech sequence and the feature extraction is performed on each speech sub-sequence to obtain a target feature corresponding to each speech sub-sequence. In step S1330, each target feature is input to a speech detection model for detection, and valid speech is determined based on the detection result. In step S1340, a target feature corresponding to the valid speech is input into a voiceprint recognition model to determine whether the speech sequence of the target user exists. In step S1350, in response to determining that the speech sequence corresponding to the target user exists, a speech representation vector corresponding to the valid speech and a target presentation vector corresponding to the speech sequence of the target user are respectively acquired by the voiceprint recognition model, and a target valid sub-sequence is determined based on the PLDA score. In step S1360, in response to determining that the speech sequence corresponding to the target user does not exist, a first valid speech is obtained to calculate an initial representation vector, and the initial representation vector is updated by the valid speech and the PLDA score corresponding to the valid speech to obtain the target representation vector, and then step S1350 is performed. In step S1370, the target valid sub-sequences are composed into the target speech.

A person skilled in the art will appreciate that all or some of the steps to implement the above-described embodiments are implemented as a computer program executed by a CPU. When the computer program is executed by the CPU, it performs the above-described functions as defined by the above-described method provided in the present disclosure. The program may be stored in a computer-readable storage medium, which may be a read-only memory, a disk or a CDROM, etc.

Furthermore, it should be noted that the accompanying drawings provide only a schematic illustration of the processing included in the method according to exemplary embodiments of the present disclosure, and are not intended as limitations. It should be understood that the processing shown in the accompanying drawings does not indicate or limit the temporal order of such processing. It should be further understood that the processing may be performed, for example, in multiple modules, either synchronously or asynchronously.

Embodiments of devices of the present disclosure will be described below and can be used to perform the speech processing method described above in the present disclosure. For details not disclosed in the device embodiments of the present disclosure, please refer to the embodiments of the speech processing method described above in the present disclosure.

Figure 14:
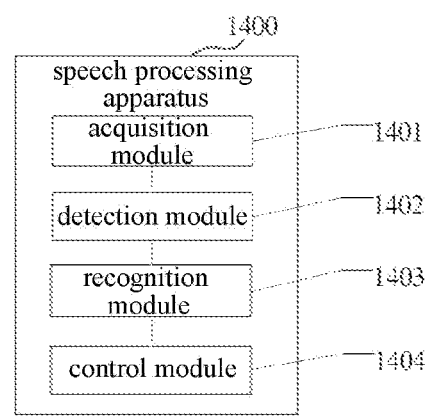
FIG. 14 schematically illustrates a block diagram of a speech processing apparatus according to an embodiment of the present disclosure.

FIG. 14 schematically illustrates a block diagram of a speech processing apparatus according to an embodiment of the present disclosure.

Referring to FIG. 14, the speech apparatus 1400, according to an embodiment of the present disclosure, includes an acquisition module 1401, a detection module 1402, a recognition module 1403, and a control module 1404.

In particular, the acquisition module 1401 is configured to acquire a speech sequence, obtain a plurality of speech sub-sequences by performing framing processing on the speech sequence, and extract a target feature of each speech sub-sequence of the plurality of speech sub-sequences.

The detection module 1402 is configured to detect each speech sub-sequence of the plurality of speech sub-sequences by a speech detection model according to each target feature, and determine valid speech based on a detection result.

The recognition module 1403 is configured to input a target feature corresponding to the valid speech into the voiceprint recognition model 800, and screen out target speech from the valid speech by the voiceprint recognition model 800.

The control module 1404 is configured to control the target speech to be forwarded to the other client.

In exemplary embodiments of the present disclosure, the acquisition module 1401 is further configured to calculate speech energy and a Mel-filter parameter corresponding to each speech sub-sequence of the plurality of speech sub-sequences; and obtaining the target feature of each speech sub-sequence of the plurality of speech sub-sequences by a dot product between the speech energy and the Mel-filter parameter corresponding to the each speech sub-sequence of the plurality of speech sub-sequences.

In exemplary embodiments of the present disclosure, the detection module 1402 is further configured to obtain a target probability of a speech sub-sequence corresponding to each target feature by inputting each target feature into the speech detection model for feature extraction; and determine, in response to a target probability of a speech sub-sequence being greater than a first probability threshold, the speech sub-sequence as a valid speech sub-sequence.

In exemplary embodiments of the present disclosure, the recognition module 1403 is further configured to determine the target feature corresponding to the valid speech as a valid target feature, and obtain a speech representation vector of a valid speech sub-sequence corresponding to the valid target feature by inputting the valid target feature into the voiceprint recognition model for feature extraction; obtain a target representation vector, calculating a Probabilistic Linear Discriminant Analysis (PLDA) score corresponding to the valid speech sub-sequence based on the speech representation vector and the target representation vector; and determine, in response to the PLDA score being greater than a scoring threshold, the valid speech sub-sequence as the target speech.

In exemplary embodiments of the present disclosure, the recognition module 1403 is further configured to input the valid target feature into the voiceprint recognition model, and obtain a deep feature of the valid target feature by performing feature extraction on the valid target feature sequentially using the convolutional layer and the double-layer LSTM layer, wherein the deep feature comprises time dimension and feature dimension; obtain a maximum feature and a mean feature of the deep feature in the time dimension by inputting the deep feature into the pooling layer for feature extraction, and obtain a hidden layer feature by summing the maximum feature and the mean feature; and obtain the speech representation vector of the valid speech sub-sequence by inputting the hidden layer feature into the affine layer for affine transformation.

The specific details of the above speech processing apparatus have been described detail in the corresponding speech processing methods, so they are not repeated here.

It should be noted that although several modules or models of the apparatus for execution are mentioned in the detailed description above, the division of the apparatus is not mandatory. In fact, according to the embodiments of the present disclosure, the features and functions of two or more modules or models described above may be specified in a single module or model. Conversely, the features and functions of one module or model described above may be further divided to be specified by multiple modules or models.

In exemplary embodiments of the present disclosure, there is also provided an electronic device capable of implementing the above methods.

Those skilled in the art will understand that various aspects of the present disclosure can be implemented as systems, methods, or program products. Accordingly, the various aspects of the present disclosure may be specifically implemented in the form of a fully hardware implementation, a fully software implementation (including firmware, microcode, etc.), or a combination of hardware and software aspects, which may be collectively referred to herein as a "circuit," "module" or "system".

An electronic device 1500 according to the embodiment of the present disclosure is described below with reference to FIG. 15. The electronic device 1500 shown in FIG. 15 is only an example and should not impose any limitations on the functionality and scope of use of the embodiments of the present disclosure.

Figure 15:
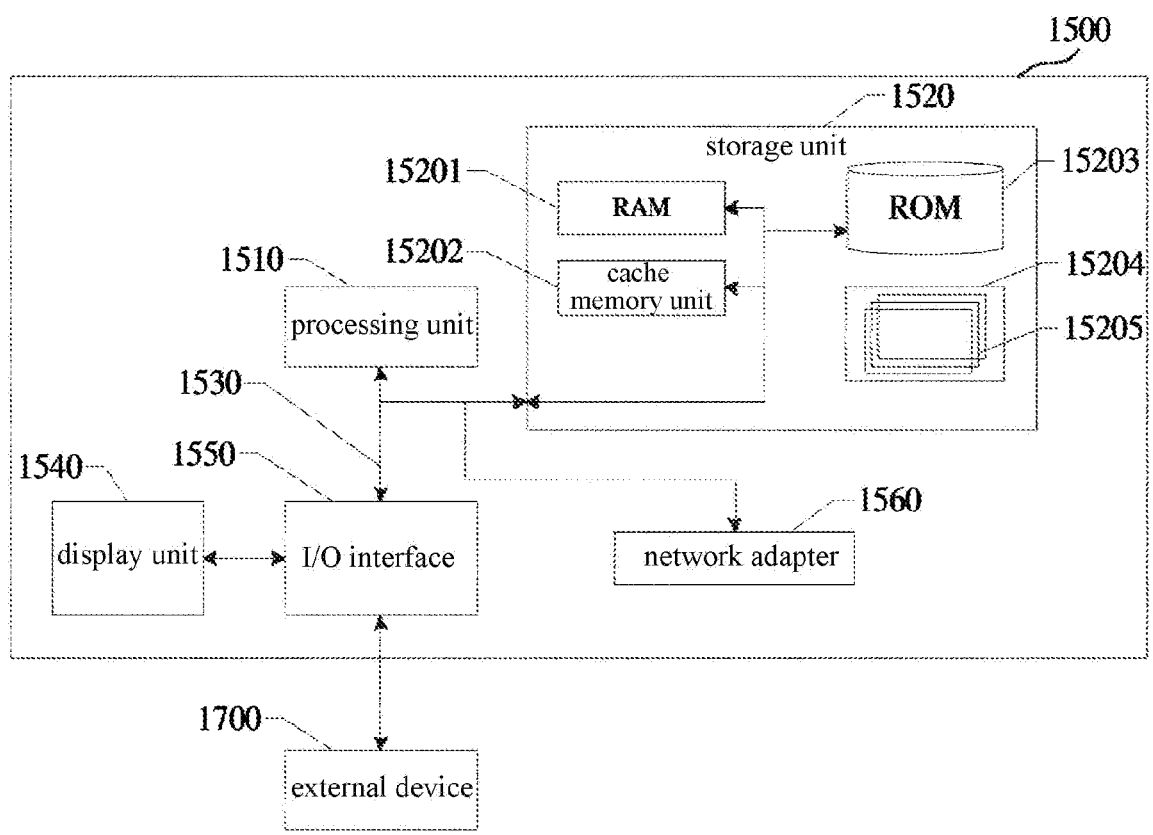
FIG. 15 schematically illustrates a schematic diagram of a module of an electronic device according to an embodiment of the present disclosure.

As shown in FIG. 15, the electronic device 1500 is represented in the form of a general-purpose computing device. Components of electronic device 1500 may include, but are not limited to, at least one processing unit 1510, at least one storage unit 1520, a bus 1530 connecting different system components including storage unit 1520 and processing unit 1510, and a display unit 1540.

The storage unit stores program code, which is executable by the processing unit 1510 such that the processing unit 1510 performs the steps described in the method embodiments above. For example, the processing unit 1510 may perform: step S110, acquiring a speech sequence, obtaining a plurality of speech sub-sequences by performing framing processing on the speech sequence, and extracting a target feature of each speech sub-sequence; step S120, detecting each speech sub-sequence by a speech detection model according to each target feature, and determining valid speech based on a detection result; and step S130, inputting a target feature corresponding to the valid speech into a voiceprint recognition model 800, and screening out target speech from the valid speech by the voiceprint recognition model 800.

The storage unit 1520 may include readable medium in the form of volatile storage units, such as a random access storage unit (RAM) 15201 and/or a cache memory unit 15202. The storage unit 1520 may further include a read-only memory unit (ROM) 15203.

The storage unit 1520 may also include a program/utility 15204 having a set of (at least one) program modules 15205, such program module 15205 including, but not limited to: an operating system, one or more applications, other program modules, and program data. Each of these examples, or some combination thereof, may include an implementation of a network environment.

The bus 1530 may be one or more of several types of bus structures, including a memory unit bus or memory unit controller, a peripheral bus, a graphics acceleration port, or a local bus of any bus structure in a processing unit or using multiple bus structures.

The electronic device 1500 may also communicate with one or more external devices 1700 (e.g., keyboards, pointing devices, Bluetooth devices, etc.), may also communicate with one or more devices that enable the user to interact with the electronic device 1500, and/or may communicate with any device that enables the electronic device 1500 to communicate with one or more other computing devices (e.g., routers, modems, etc.). The communication can be conducted through the input/output (I/O) interface 1550. This communication can be done through the input/output (I/O) interface 1550. Moreover, the electronic device 1500 may also communicate with one or more networks (e.g., a local area network (LAN), a wide area network (WAN), and/or a public network, such as the Internet) via the network adapter 1560. As shown in FIG. 15, the network adapter 1560 communicates via bus 1530 with the other modules of the electronic device 1500. It should be understood that, although not shown in the figures, other hardware and/or software modules may be used in conjunction with the electronic device 1500, including but not limited to: microcode, device drives, redundant processing units, external disk drive arrays, RAID systems, tape drives, and data backup storage systems, etc.

From the above description of the embodiments, it will be readily understood by those of skill in the art that the exemplary embodiments described herein may be implemented by software or by software in combination with the necessary hardware. Thus, a technical solution according to the embodiments of the present disclosure may be embodied in the form of a software product, which may be stored on a non-volatile storage medium (which may be a CD-ROM, USB stick, removable hard disk, etc.) or on a network, including a number of instructions to enable a computing device (which may be a personal computer, a server, a terminal device, or a network device, etc.) to perform a method according to the embodiments of the present disclosure.

In exemplary embodiments of the present disclosure, there is also provided a computer-readable storage medium having stored thereon a program product capable of implementing the method described above in this specification. In some possible embodiments, various aspects of the present disclosure may also be implemented in the form of a program product including program code that, when the program product is run on a terminal device, is used to cause the terminal device to perform the steps described in the method embodiments above.

Figure 16:
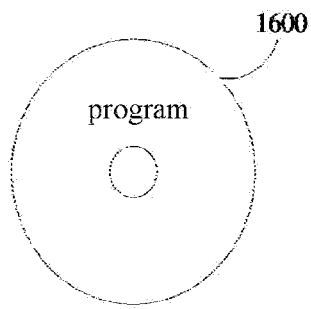
FIG. 16 schematically illustrates a schematic diagram of a program product according to an embodiment of the present disclosure.

Referring to FIG. 16, it shows a program product 1600 for implementing the above methods according to embodiments of the present disclosure, which may employ a portable compact disk read-only memory (CD-ROM) and include program code and may run on the terminal end device, such as a personal computer. However, the program products of the present disclosure are not limited thereto, and for the purposes of this disclosure, a readable storage medium may be any tangible medium containing or storing a program that may be used by or in combination with an instruction execution system, apparatus, or device.

The program product may employ any combination of one or more readable medium. The readable medium may be a readable sequential medium or a readable storage medium. The readable storage medium may be, for example, but not limited to, an electrical, magnetic, optical, electromagnetic, infrared, or semiconductor-based system, apparatus, or device, or any combination of the above. More specific examples of the readable storage medium (a non-exhaustive list) include: an electrical connection with one or more wires, portable disks, hard disks, random access memory (RAM), read-only memory (ROM), erasable programmable read-only memory (EPROM or flash memory), optical fiber, portable compact disks read-only memory (CD-ROM), optical memory devices, magnetic memory devices, or any suitable combination of the above.

The computer readable sequential medium may include a sequence of data propagated in the baseband or as part of a carrier, which carries readable program code. Such propagated data sequences may take a variety of forms, including but not limited to electromagnetic sequences, optical sequences, or any suitable combination of the above. The readable sequence medium may also be any readable medium other than the readable storage medium that may send, propagate, or transmit a program for use by or in conjunction with a command execution system, apparatus, or device.

The program code contained on the readable medium may be transmitted via any suitable medium, including but not limited to wireless, wired, fiber optic, RF, etc., or any suitable combination of the above.

The program code for performing the operations of this disclosure may be written in any combination of one or more programming languages. The programming languages include object-oriented programming languages, such as Java, C++, etc., and may also include conventional procedural programming languages, such as C programming language or similar programming languages. The program code may be executed entirely on the user computing device, partially on the user device, as a stand-alone package, partially on the user computing device and partially on the remote computing device, or entirely on the remote computing device or server. In the case involving a remote computing device, the remote computing device may be connected to the user computing device via any kind of network, including a local area network (LAN) or a wide area network (WAN), or, alternatively, may be connected to an external computing device (e.g., using an Internet service provider to connect via the Internet).

Further, the accompanying drawings provide only a schematic illustration of the processing included in the method according to exemplary embodiments of the present disclosure, and are not intended as limitations. It should be understood that the processing shown in the accompanying drawings does not indicate or limit the temporal order of such processing. It should be further understood that the processing may be performed, for example, in multiple modules, either synchronously or asynchronously.

Other embodiments of the present disclosure will readily come to the mind of those skilled in the art upon consideration of the specification and practice of the application disclosed herein. The present disclosure is intended to cover any variations, uses, or adaptations of the present disclosure that follow the general principles of the present disclosure and include common knowledge or techniques in the technical field not disclosed by the present disclosure. The specification and examples are to be regarded as exemplary only, with the true scope and spirit of the present disclosure being indicated by the claims.

It should be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A speech processing method, comprising:
acquiring a speech sequence, obtaining a plurality of speech sub-sequences by performing framing processing on the speech sequence, and extracting a target feature of each speech sub-sequence of the plurality of speech sub-sequences;
detecting each speech sub-sequence of the plurality of speech sub-sequences by a speech detection model according to each target feature, and determining valid speech based on a detection result;
inputting a target feature corresponding to the valid speech into a voiceprint recognition model, and screening out target speech from the valid speech by the voiceprint recognition model; and
controlling the target speech to be forwarded to a client;
wherein the voiceprint recognition model comprises a convolutional layer, a double-layer Long-Short Term Memory (LSTM) layer, a pooling layer, and an affine layer, and the inputting the target feature corresponding to the valid speech into the voiceprint recognition model and screening out the target speech from the valid speech by the voiceprint recognition model, comprises:
determining the target feature corresponding to the valid speech as a valid target feature;
inputting the valid target feature into the voiceprint recognition model, and obtaining a deep feature of the valid target feature by performing feature extraction on the valid target feature sequentially using the convolutional layer and the double-layer LSTM layer, wherein the deep feature comprises time dimension and feature dimension;
obtaining a maximum feature and a mean feature of the deep feature in the time dimension by inputting the deep feature into the pooling layer for feature extraction, and obtaining a hidden layer feature by summing the maximum feature and the mean feature; and obtaining a speech representation vector of a valid speech sub-sequence corresponding to the valid target feature by inputting the hidden layer feature into the affine layer for affine transformation.

2. The method according to claim 1, wherein the detecting each speech sub-sequence of the plurality of speech sub-sequences by the speech detection model according to each target feature, comprises:
obtaining a target probability of a speech sub-sequence corresponding to each target feature by inputting each target feature into the speech detection model for feature extraction; and
determining, in response to a target probability of a speech sub-sequence being greater than a first probability threshold, the speech sub-sequence as a valid speech sub-sequence.

3. The method according to claim 1, further comprising:
acquiring an initial noise sub-sequence in the speech sequence, and calculating noise energy corresponding to the speech sequence based on the initial noise sub-sequence;
calculating speech energy of each speech sub-sequence of the plurality of speech sub-sequences, and determining a signal-to-noise ratio corresponding to each speech sub-sequence of the plurality of speech sub-sequences based on the noise energy and the speech energy; and
determining that a signal-to-noise ratio corresponding to a speech sub-sequence is greater than a signal-to-noise threshold.

4. The method according to claim 3, wherein the acquiring the initial noise sub-sequence in the speech sequence and calculating the noise energy corresponding to the speech sequence based on the initial noise sub-sequence, comprises:
determining a first predetermined number of the plurality of speech sub-sequences of the speech sequence as initial noise sub-sequences, calculating the speech energy of the initial noise sub-sequences, and determining the speech energy of the initial noise sub-sequences as an initial noise energy; and
acquiring a time series corresponding to the speech sequence, and iteratively updating the initial noise energy based on the time series, the initial noise energy, and the speech energy corresponding to the speech sequence.

5. The method according to claim 1, further comprising:
obtaining a target probability and a signal-to-noise ratio of each speech sub-sequence of the plurality of speech sub-sequences;
determining, in response to a target probability of a speech sub-sequence being greater than a first probability threshold, whether a signal-to-noise ratio corresponding to the speech sub-sequence is greater than a signal-to-noise ratio threshold; and
determining, in response to the signal-to-noise ratio corresponding to the speech sub-sequence being greater than the signal-to-noise ratio threshold, the speech sub-sequence as a valid speech sub-sequence.

6. The method according to claim 2, wherein the determining the valid speech based on the detection result comprises:
obtaining a plurality of groups of consecutive speech sequences by performing a sliding window operation on the speech sequence, wherein a window length of the sliding window operation is greater than a window offset; and
obtaining a number of valid speech sub-sequences in each group of consecutive speech sequences, and determining, in response to the number of valid speech sub-sequences in one group of consecutive speech sequences being greater than a number threshold, the group of consecutive speech sequences as the valid speech.

7. The method according to claim 1, further comprising:
obtaining a target representation vector, calculating a Probabilistic Linear Discriminant Analysis (PLDA) score corresponding to the valid speech sub-sequence based on the speech representation vector and the target representation vector; and
determining, in response to the PLDA score being greater than a scoring threshold, the valid speech sub-sequence as the target speech.

8. The method according to claim 7, wherein the obtaining the target representation vector comprises:
obtaining a target speech sequence, and obtaining the target representation vector of the target speech sequence by inputting a target feature corresponding to the target speech sequence into the voiceprint recognition model for feature extraction; and/or
obtaining first valid speech in the valid speech, and determining the first valid speech as an initial speech sequence, obtaining an initial representation vector corresponding to the initial speech sequence by inputting the target feature corresponding to the initial speech sequence into the voiceprint recognition model for feature extraction, calculating the PLDA score using the initial representation vector as the target representation vector, and updating the target representation vector according to the initial representation vector, a time series, and the PLDA score.

9. The method according to claim 8, wherein the updating the target representation vector according to the initial representation vector, the time series, and the PLDA score, comprises:
calculating an updated representation vector according to the initial representation vector, the PLDA score corresponding to the initial representation vector, and a time difference between a timestamp corresponding to the initial representation vector and a current timestamp;
repeating the previous step using the updated representation vector as a new initial representation vector; and
determining the updated representation vector after the repetition as the target representation vector.

10. The method according to claim 1, wherein the obtaining the plurality of speech sub-sequences by performing framing processing on the speech sequence, comprises:
performing pre-emphasis processing on the speech sequence, and obtaining the plurality of speech sub-sequences by performing framing processing on the pre-emphasized speech sequence according to a predetermined frame length and a predetermined frame offset, wherein the predetermined frame length is greater than the predetermined frame offset.

11. The method according to claim 1, wherein the extracting the target feature of each speech sub-sequence of the plurality of speech sub-sequences, comprises:
calculating speech energy and a Mel-filter parameter corresponding to each speech sub-sequence of the plurality of speech sub-sequences; and
obtaining the target feature of each speech sub-sequence of the plurality of speech sub-sequences by a dot product between the speech energy and the Mel-filter parameter corresponding to the each speech sub-sequence of the plurality of speech sub-sequences.

12. The method according to claim 3, wherein the calculating the speech energy of each speech sub-sequence of the plurality of speech sub-sequences, comprises:
performing windowing processing on each speech sub-sequence of the plurality of speech sub-sequences, and obtaining a Fourier parameter of each speech sub-sequence of the plurality of speech sub-sequences by performing a Fourier transform on the windowed speech sub-sequence; and
calculating the speech energy of each speech sub-sequence of the plurality of speech sub-sequences according to the Fourier parameter of each speech sub-sequence of the plurality of speech sub-sequences.

13. The method according to claim 11, wherein the calculating the Mel-filter parameter corresponding to each speech sub-sequence of the plurality of speech sub-sequences, comprises:
obtaining a Mel frequency of each speech sub-sequence of the plurality of speech sub-sequences by performing a mapping transformation in a Mel frequency domain for each speech sub-sequence of the plurality of speech sub-sequences, and calculating the Mel-filter parameter corresponding to each speech sub-sequence of the plurality of speech sub-sequences according to the Mel frequency of each speech sub-sequence of the plurality of speech sub-sequences.

14. The method according to claim 1, further comprising:
obtaining a plurality of speech sequence samples, wherein the plurality of speech sequence samples comprise valid speech samples and non-valid speech samples;
obtaining a first tagging information sample of each speech sequence sample of the plurality of speech sequence samples by tagging each valid speech sample and each non-valid speech sample; and
inputting each speech sequence sample of the plurality of speech sequence samples and a corresponding first tagging information sample thereof into a candidate speech detection model, and obtaining the speech detection model by training the candidate speech detection model according to each speech sequence sample of the plurality of speech sequence samples and the corresponding first tagging information sample thereof.

15. The method according to claim 14, wherein the inputting each speech sequence sample of the plurality of speech sequence samples and the corresponding first tagging information sample thereof into the candidate speech detection model, and obtaining the speech detection model by training the candidate speech detection model according to the each speech sequence sample of the plurality of speech sequence samples and the corresponding first tagging information sample thereof, comprises:
inputting each speech sequence sample of the plurality of speech sequence samples into the candidate speech detection model, and obtaining first tagging information corresponding to each speech sequence sample of the plurality of speech sequence samples by performing feature extraction on each speech sequence sample of the plurality of speech sequence samples using the candidate speech detection model; and
determining a first loss function according to the first tagging information and the first tagging information sample, and obtaining the speech detection model by adjusting a parameter of the candidate speech detection model until the first loss function is minimized.

16. The method according to claim 1, further comprising:
obtaining a plurality of valid speech sequence samples, wherein the plurality of valid speech sequence samples comprise target speech sequence samples and non-target speech sequence samples;
obtaining a second tagging information sample of each valid speech sequence sample of the plurality of valid speech sequence samples by tagging each target speech sequence sample and each non-target speech sequence sample; and
inputting each valid speech sequence sample of the plurality of valid speech sequence samples and a corresponding second tagging information sample thereof to a candidate voiceprint recognition model, and obtaining the voiceprint recognition model by training the candidate voiceprint recognition model according to each valid speech sequence sample of the plurality of valid speech sequence samples and the corresponding second tagging information sample thereof.

17. The method according to claim 16, wherein the inputting each valid speech sequence sample of the plurality of valid speech sequence samples and the corresponding second tagging information sample thereof to the candidate voiceprint recognition model, and obtaining the voiceprint recognition model by training the candidate voiceprint recognition model according to each valid speech sequence sample of the plurality of valid speech sequence samples and the corresponding second tagging information sample thereof, comprises:
inputting each valid speech sequence sample of the plurality of valid speech sequence samples into the candidate voiceprint recognition model, and obtaining second tagging information corresponding to each valid speech sequence sample of the plurality of valid speech sequence samples by performing feature extraction on each valid speech sequence sample of the plurality of valid speech sequence samples using the candidate voiceprint recognition model; and
determining a second loss function according to the second tagging information and the second tagging information sample, and obtaining the voiceprint recognition model by adjusting a parameter of the candidate voiceprint recognition model until the second loss function is minimized.

18. A non-transitory computer-readable storage medium with a computer program stored thereon, wherein the computer program, when executed by a processor, causes the processor to implement the speech processing method according to claim 1.

19. An electronic device, comprising:
one or more processors; and
a memory for storing one or more programs that, when executed by the one or more processors, cause the one or more processors to implement the speech processing method according to claim 1.

* * * * *